(12) United States Patent
Nowottnick

(10) Patent No.: US 9,048,681 B2
(45) Date of Patent: Jun. 2, 2015

(54) WIRELESS POWER AND DATA APPARATUS, SYSTEM AND METHOD

(75) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 436 days.

(21) Appl. No.: 13/402,546

(22) Filed: Feb. 22, 2012

(65) Prior Publication Data

US 2013/0214732 A1 Aug. 22, 2013

(51) Int. Cl.
*H02J 7/00* (2006.01)
*H02J 7/02* (2006.01)
*G07C 9/00* (2006.01)

(52) U.S. Cl.
CPC .............. *H02J 7/025* (2013.01); *G07C 9/00309* (2013.01); *G07C 2009/00793* (2013.01)

(58) Field of Classification Search
CPC .................. G07C 9/00309; G07C 2009/00793
USPC .......................................................... 320/108
See application file for complete search history.

(56) References Cited

U.S. PATENT DOCUMENTS

| | | | |
|---|---|---|---|
| 6,275,143 B1 * | 8/2001 | Stobbe ....................... 340/10.34 |
| 7,426,275 B2 | 9/2008 | Sugawara | |
| 7,612,528 B2 | 11/2009 | Baarman et al. | |
| 8,823,319 B2 | 9/2014 | Von Novak, III et al. | |
| 2007/0176752 A1 * | 8/2007 | Mickle et al. .............. 340/10.33 |
| 2007/0279002 A1 * | 12/2007 | Partovi .......................... 320/115 |
| 2008/0001572 A9 * | 1/2008 | Baarman et al. .............. 320/108 |
| 2008/0024322 A1 | 1/2008 | Riemschneider | |
| 2010/0181961 A1 * | 7/2010 | Novak et al. .................. 320/108 |
| 2012/0153894 A1 * | 6/2012 | Widmer ........................ 320/108 |
| 2012/0299538 A1 * | 11/2012 | Arai et al. ..................... 320/108 |

FOREIGN PATENT DOCUMENTS

| | | |
|---|---|---|
| CN | 101044664 A | 9/2007 |
| CN | 102292896 A | 12/2011 |
| CN | 202144692 U | 2/2015 |
| WO | 2010/116307 A1 | 10/2010 |

* cited by examiner

*Primary Examiner* — Richard Isla Rodas
*Assistant Examiner* — David V Henze-Gongola

(57) ABSTRACT

Wireless charging and data communication are effected. In accordance with various example embodiments, a transceiver-type circuit wirelessly charges portable devices, such as hand-held telephones via wireless signals, and also wirelessly communicates data with remote transponders. The data communication is carried out to facilitate authentication of the remote transponders and may, for example, be limited relative to a power-carrying capability of the transponders. Such aspects may be implemented, for example, in a transceiver for both transponder-based operation and (high-power) wireless charging applications in vehicle-based circuits.

20 Claims, 3 Drawing Sheets

WIRELESS POWER AND DATA APPARATUS, SYSTEM AND METHOD

Aspects of various embodiments of the present invention are directed to wireless power and data applications.

Many wireless communication systems employ transponders and base stations that communicate with one another. For example, transponders can be used in automotive applications for immobilizer circuits, or other circuits for enabling an ignition circuit. Generally, transponders communicate with a base station to unlock doors and/or an automobile ignition, or otherwise enable related circuits. Many such circuits use an ISM (Industrial Scientific Medical) frequency band of about 125 kHz, which can be useful in a metal environment (as with automobiles) and is relatively insensitive to de-tuning (e.g., by touching).

In some implementations, including most transponder applications for vehicle access/immobilization, the energy used to operate such transponders can also be provided wirelessly. For instance, a low-frequency field can be provided by a base station and used to power transponders via low frequency (LF) power, with the transponder using the power to operate circuitry to communicate with the base station. The same low-frequency field can also be used as carrier for data communications between the base station and the transponder.

While being useful for a variety of applications, such systems have often been limited in use with respect to wireless applications. These and other matters have presented challenges to the design and implementation of wireless systems for a variety of applications.

Various example embodiments are directed to wireless communication and powering, and to such circuits and their implementation.

According to an example embodiment, wireless communication is effected between a vehicle base station and a transponder using a signal with a carrier frequency, which is also used to power, or charge, a device such as a mobile telephone, computer or other hand-held device. The powering for charging can be effected at a high power (and at short range), with the power for remote transponder communication being limited in power relative to operating capabilities of the transponder.

Another example embodiment is directed to wirelessly charging portable devices, and both powering and authenticating remote operator-carried transponders for activating an automotive circuit. In a first mode, a first signal is generated and transmitted to wirelessly charge a portable device. In a second mode, responsive to detecting the presence of a remote transponder, a second signal is generated and transmitted to power and communicate authentication data with the remote transponder. The transponder is authenticated by accessing and processing stored authentication data with authentication data carried in signals received from the remote transponder, and an output is generated for activating the automotive circuit, based upon the authentication.

Another example embodiment is directed to a vehicle base station for wirelessly charging portable devices and communicating with remote operator-carried transponders. The base station includes a transceiver, an authentication module and an interface that communicates data over a vehicle bus. The transceiver operates in a first mode to generate and transmit a high-power signal to transmit wireless power to a portable device at a first frequency. The transceiver also operates in a second mode to generate and transmit a low-power data-carrying signal (also at the first frequency) to communicate authentication data with a remote operator-carried transponder, and also to receive authentication data from the remote operator-carried transponder. The authentication module processes authentication data received from the remote operator-carried transponder with stored authentication data and, based on the processing, authenticating the remote operator-carried transponder. Activation data is communicated over the vehicle bus, via the interface module, to control the operation of at least one vehicle circuit based on the authentication.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
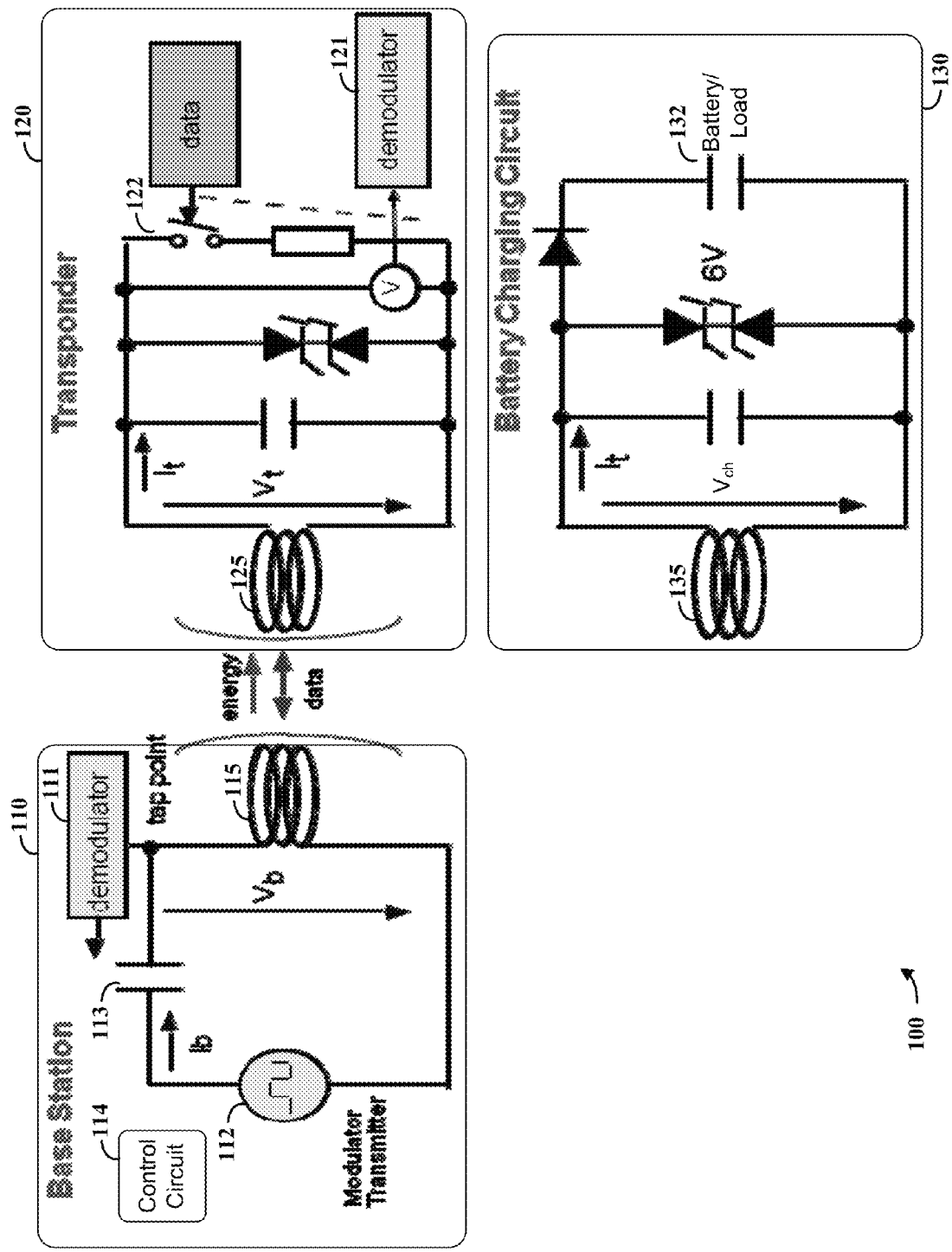
FIG. 1 shows a wireless apparatus and a system for communicating with remote transponders and powering/charging remote devices, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements for involving transponder-base station coupling and wireless device powering, including those involving automotive applications. While the present invention is not necessarily so limited, various aspects of the invention may be appreciated through a discussion of examples using this context.

Various example embodiments are directed to circuits and methods that address challenges, such as those identified in the background above. In accordance with one or more embodiments, a carrier signal circuit operates to pass signals with a transponder for wireless communication and power/charging, using a common (e.g., carrier) frequency. Such applications may involve, for example, immobilizer-type communications and data exchange (e.g., in which a vehicle is immobilized or access thereto is inhibited, absent the presence of a transponder), as well as wireless charging of remote devices.

In this regard, a variety of remote wireless devices, such as hand-held telephones, GPS units, laptop computers, tablets and others can be powered and/or charged via a low frequency (LF) circuit that also operates for data communications with transponders. Such a remote device may be placed in a charging cradle or platform, to facilitate the transfer of power from the LF circuit. Moreover, such a transponder itself may be wirelessly powered/charged via the same LF carrier signal used to send data for vehicle access or engagement. In addition, wireless power/charging aspects of various embodiments can be effected without additional hardware relative to transponder-communicating hardware.

The applications can easily be synchronized, since controlled by the common base station.

In connection with various example embodiments, a carrier signal circuit operates to communicate with a remote transponder and to wirelessly power remote devices using a common carrier wave. Communications with the transponder are effected to ensure the presence of the transponder to operating a circuit, such as prior to enabling a vehicle drive system (e.g., for starting an engine or engaging an electric drive system) or prior to activating a circuit that provides access to the vehicle (e.g., unlocks doors). Communications with the transponder can be prioritized over wireless power communications, to ensure timely access to and/or engagement of a vehicle, with a powering/charging application interrupted to effect transponder communications. In some implementations, the interruption of the powering/charging application is delayed (e.g., momentarily) to allow a powering/charging termination process as may be useful for managing such applications, before switching over to a (prioritized) transponder communication sequence. Once access and/or engagement has been effected, communications with the transponder can cease and the wireless communications/power circuit can power and/or charge remote devices using the same carrier frequency used with the transponder. Using this approach, only one of the transponder and wireless power/charging applications can be activated during a given time, mitigating disturbance between applications (e.g., the wireless power/charge application will not interfere with transponder communications), which can also be effected without additional circuitry as may, for example, be necessary with separate systems.

Communications between the carrier signal circuit and transponder can be effected in a variety of manners. For instance, in certain applications, the carrier signal circuit is part of a base station in a vehicle, and a transponder is a user-carried device that is used to access the vehicle. When the transponder is in proximity of the vehicle, the base station communicates with the transponder via an antenna. In some embodiments, the base station sends a polling signal and the transponder responds to the polling signal (when within range to receive the signal). Upon detection of the response, the base station initiates authentication communications with the transponder. In such embodiments, the base station interrupts wireless power/charging operations to effect the polling signal and further in response to receiving an acknowledgement from the transponder and correspondingly initiating authentication steps.

In other embodiments, the base station does not poll for transponders, and the remote transponder initiates a polling signal. This can be effected, for example, in response to a user interacting with the transponder, such as by pressing a button on the transponder or by moving the transponder (e.g., with motion sensing circuitry in the transponder detecting the movement). This can also be effected when a user presses a start button in communication with a base station (e.g., within a vehicle, for initiating the ignition of an engine or activation of a battery-powered drive system). A receiver at the base station monitors for the transponder polling signal, and initiates an authentication sequence in response to detecting a transponder polling signal. As in the above, example, the base station prioritizes communications with the transponder, and can otherwise power/charge a remote device. For instance, the base station may power/charge a remote device using a carrier signal having a frequency also used for communicating with the transponder, until a polling signal from the transponder is detected. Upon detecting the polling signal, wireless power/charge signals are stopped and communications are effected with the transponder for authentication. Once communications with the transponder have been appropriately effected (e.g., to unlock the door of a vehicle and/or to enable a vehicle drive system), the base station can resume wireless power/charging operations.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in FIG. 1. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

In some embodiments, first and second modules are implemented to respectively carry out power/communication and authentication. The first module generates and transmits a signal to wirelessly charge a portable device in a first operating mode, such as a high-power mode for transmitting a sufficient power for charging such a device (e.g., 5-10W of power). When a remote transponder is present, such as may be detected via receipt of a signal from the remote transponder, the first module generates and transmits a signal to power and communicate authentication data with the remote transponder in a second mode, such as by communicating data-carrying radio frequency signals. These respective modes can be carried out independently from one another, such as to limit the amount of wireless power transmitted to the transponder. Another module authenticates the transponder based on communications therewith. For instance, stored authentication data can be accessed and processed with authentication data carried in signals received from the remote transponder via the first module. This authentication can be used to operate a vehicle circuit, such as by operating a starter circuit for engaging a vehicle drive system.

The respective signals may be transmitted or communicated using a variety of approaches. In some embodiments, a signal is generated using high power to power portable devices located near (e.g., within a few millimeters) an antenna driven with the signal. This approach may involve, for example, driving an antenna or an array of antennas on a vehicle dashboard or console on which a portable device such as a mobile phone can be placed for charging. In addition, this high power level can be at a level that exceeds an operating power level of transponders with which the antenna communicates, but that is useful in charging portable devices. The signal transmitted to remote transponders can be effected at a reduced power level at which the transponder operates (e.g., where the high power level may overdrive the transponder, thus). These respective power-based approaches facilitate the use of relatively simple and small transponders (e.g., as larger circuits or power dissipation may be needed for high-power communications), while also providing enough power to operate and/or charge the battery of hand-held devices such as mobile phones, GPS units and computers. Moreover, the respective signals can be communicated using a common frequency (e.g., a carrier frequency), which also simplifies the base station.

As discussed above, various types of base station-transponder communications can be effected in accordance with one or more example embodiments. For instance, transponder-based communications for immobilization applications can be integrated with wireless charging applications. As another example, one or more embodiments may be implemented with a variety of different types of immobilizer systems or as backup transponder-based communications in PKE or PKG systems. Accordingly, methods, systems, base stations or transponders as discussed herein may be implemented in a manner similar to and/or in connection with components such as described in U.S. Patent Publication No. 2008/0024322, in U.S. Pat. No. 7,426,275, or in U.S. patent application Ser. No. 13,046,194 entitled "Field Superposition System and Method Therefor," all of which are fully incorporated herein by reference.

Turning now to the figures, FIG. 1 shows apparatuses and a system 100 for communicating with remote transponders and powering/charging remote devices, in accordance with example embodiments of the present invention. The system 100 includes a base station 110 and a transponder 120. Also shown in FIG. 1 is a power/charging circuit 130 that provides power for operating and/or charging a battery in a remote/portable wireless device. Each of the base station 110, transponder 120 and power/charging circuit 130 can be implemented separately, in separate embodiments. Moreover, the system 100 can be implemented with the base station 110 and the transponder 120 while also interacting with the power/charging circuit 130. The system 100 may also be implemented with all three of the base station 110, transponder 120 and power/charging circuit 130. In various contexts, the transponder 120 may be integrated into one or more transponder-based systems, such as immobilizer systems, as may be implemented as a hand-held device that can be carried by an operator (e.g., in a pocket or hand bag).

The base station 110 includes a demodulator 111, a modulator/transmitter 112, a capacitive circuit 113, a control circuit 114 and an antenna 115. The control circuit 114 controls the demodulator 111 and modulator/transmitter 112 for communicating signals and transmitting power via the antenna 115. Accordingly, the control circuit 114 may be implemented in accordance with one or more embodiments herein, to facilitate both data and power transmission via antenna 115 and using a common carrier frequency, to respectively communicate and power external circuits. Moreover, this power transmission can be carried out without interfering with (e.g., prioritized) data communications as may be applicable to vehicle access and drive engagement.

The transponder 120 includes a demodulator 121 that demodulates signals received from the base station 110 via antenna 125, using the carrier frequency. The transponder 120 also includes a modulator 122, which may be implemented to initiate a communication to the base station 110 and therein control the base station to terminate any wireless power applications prior to data communication with the transponder 120, or otherwise ensure that the powering applications are not carried out or ongoing when the transponder 120 is present (e.g., powering can be resumed after transponder communications have completed). Further, while exemplary circuitry is shown for effecting transponder communications, the transponder 120 may include additional circuits or components, to suit particular needs.

The power/charging circuit 130 also includes an antenna 135 that receives wireless power transmissions from the base station 110, for powering or charging a battery/load circuit 132. The power-charging circuit 130 is also shown with other circuitry (e.g., diodes and a capacitive circuit), but can be implemented using a variety of different types of circuits.

The base station 110 operates to transmit a radio frequency signal having a common or similar carrier frequency (e.g., a 100 kHz carrier, or within about 50 kHz) to both the transponder 120 and the power/charging circuit 130, and also receives wireless data from the transponder 120 for detecting the presence of and authenticating the transponder. Accordingly, wireless power is transmitted from the base station 110 for operating the power/charging circuit 130 when the circuit is present (e.g., within a field distance of the base station 110, such as when a user places a mobile device in a cradle or on a surface adjacent a circuit via which the wireless power is transmitted). Upon detecting the presence of the transponder 120, the base station 110 communicates with the transponder for authenticating the transponder using the same carrier frequency as used to power the power/charging circuit 130. If the power/charging circuit 130 is being powered when the transponder 120 is detected (e.g., an operator approaches a vehicle with the transponder 120), the transmission of wireless power to the transponder is interrupted and communications with the transponder 120 are carried out.

In some embodiments, the control circuit 114 includes an interface for communicating over a vehicle bus. For instance, when implemented in an automobile, the base station 110 can be coupled to communicate with one or more vehicle activation-type circuits, such as a circuit to open/unlock doors and/or a circuit to operate a drive system such as an engine or battery-powered drive. This approach may be simply to "activate" the respective circuit or circuits with operation of the circuit subsequently carried out.

In some implementations, the control circuit 114 has two modules that operate as follows. The first module operates in first and second modes to charge a portable device (e.g., a device having power/charging circuit 130 therein), and to communicate with a remote transponder 120. The first module operates in a first mode to generate and transmit a first signal to wirelessly charge a portable device. The first module also operates in a second mode to, in response to detecting the presence of the remote transponder 120, generate and transmit a second signal to power and communicate authentication data with the remote transponder. The second module authenticates the transponder 120 by accessing and processing stored authentication data with authentication data carried in signals received from the remote transponder via the first module, and generates an output for activating a transponder-based automotive circuit based upon the authentication. For instance, the control circuit 114 can be connected to a vehicle bus for communicating data over the bus for operating or enabling a vehicle circuit, such as an entry circuit to unlock a door or an ignition circuit for starting an engine.

The base station 110 may include and/or be coupled to one or more antennas for transmitting power and/or data, depending upon the application. In some embodiments, the antenna 115 includes an array of antennas that facilitate the powering of portable devices aligned in different manners (e.g., the array facilitating sufficient power-based transmission contact with the devices under different conditions). The array can be driven at high power to power one or more portable devices, and one or more antennas can be driven in another low-power mode for communicating with a transponder. In other embodiments, the antenna 115 includes a remote antenna, such as a remote antenna near a vehicle door for communicating with an operator-carried transponder. Accordingly, for transponder communications, a single antenna or a subset of antennas may be driven. The respective signals can also be driven at a common or similar carrier frequency.

Figure 2:
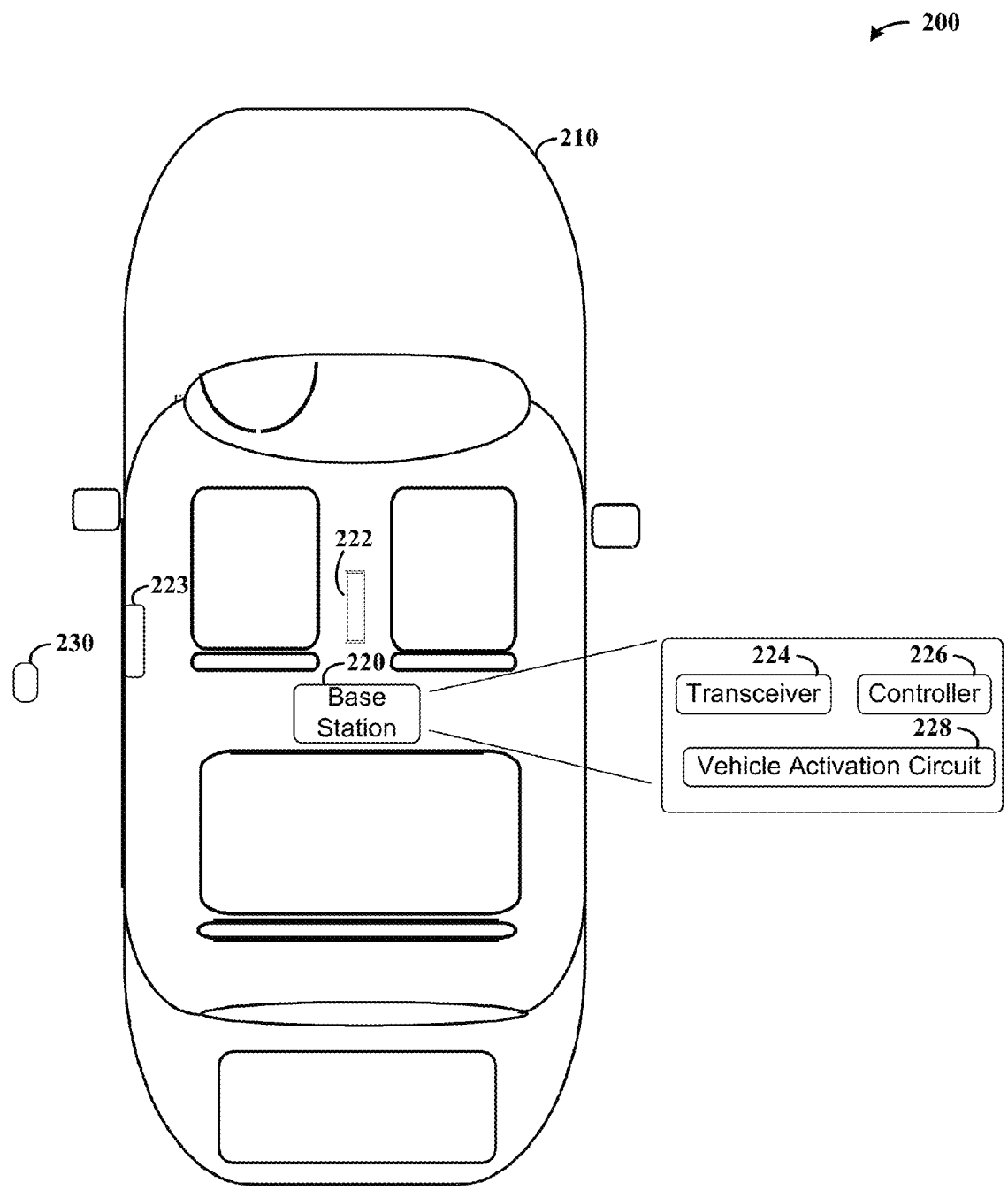
FIG. 2 shows a wireless automotive system, in accordance with another example embodiment of the present invention.

FIG. 2 shows a wireless automotive system 200, in accordance with another example embodiment of the present invention. The system 200 includes a base station 220 within a vehicle 210, and an antenna 222 connected to the base station. The base station 220 communicates with a remote transponder 230 for detecting and authenticating the transponder, in response to which a vehicle circuit is activated. Such activation may include, for example, unlocking a vehicle or enabling a vehicle starter or drive system.

As shown in the inset, the base station 220 includes a transceiver 224, a controller 226 and a vehicle activation circuit 228. The controller 226 controls the transceiver 224 to generate a signal for communicating data with the transponder and for transmitting power to a mobile device. The vehicle activation circuit 228 generates an output that can be used to permit entry to and/or enable a drive system of the vehicle 210. This vehicle activation circuit 228 may, for example, authenticate a transponder 230 and generate a signal in response to the authentication, or may simply pass along data pertaining to authentication communications from the transponder, which can be used by another circuit to authenticate the transponder and enable a vehicle circuit.

In some embodiments, the antenna 222 transmits and receives signals for the base station 220, and further transmits power from the base station to a portable device such as a mobile phone, tablet, gaming device, media playback device or other device. For instance, where the antenna 222 is located on a center console of the vehicle 210, a portable device can be placed on the console for charging the device. In addition, a transponder can be placed on or kept near the console (e.g., in an operator's pocket), in order to activate a circuit to start an engine or otherwise engage a drive system. In certain embodiments, the base station 220 also transmits power to the transponder, such as for operating the transponder and/or to charge a battery therein.

In some embodiments, a separate antenna 223 is used to communicate with the transponder 230 for effecting access to the vehicle 210. For example, a remote antenna may be located near an entry door near the transponder 230 as shown, and used for communicating data with the transponder 230 for allowing entry to the vehicle. This communication may also be effected to enable a vehicle circuit for operating the vehicle. This approach facilitates access to the antenna, by the transponder 230, when the transponder has limited range. Moreover, access to the internal antenna 222 may be facilitated at short-range to the transponder, to enable a vehicle once access has been granted. In this context, the antenna 223 may be used to detect the presence of (and authenticate) the transponder 230 near the exterior of the vehicle 210 for unlocking a door, and antenna 222 may be used to detect the presence of (and authenticate) the transponder within the vehicle. In either case, power transmission can be effected using a common carrier signal and with priority to transponder communications so as to limit or prevent interference that may occur via power transmission.

Figure 3:
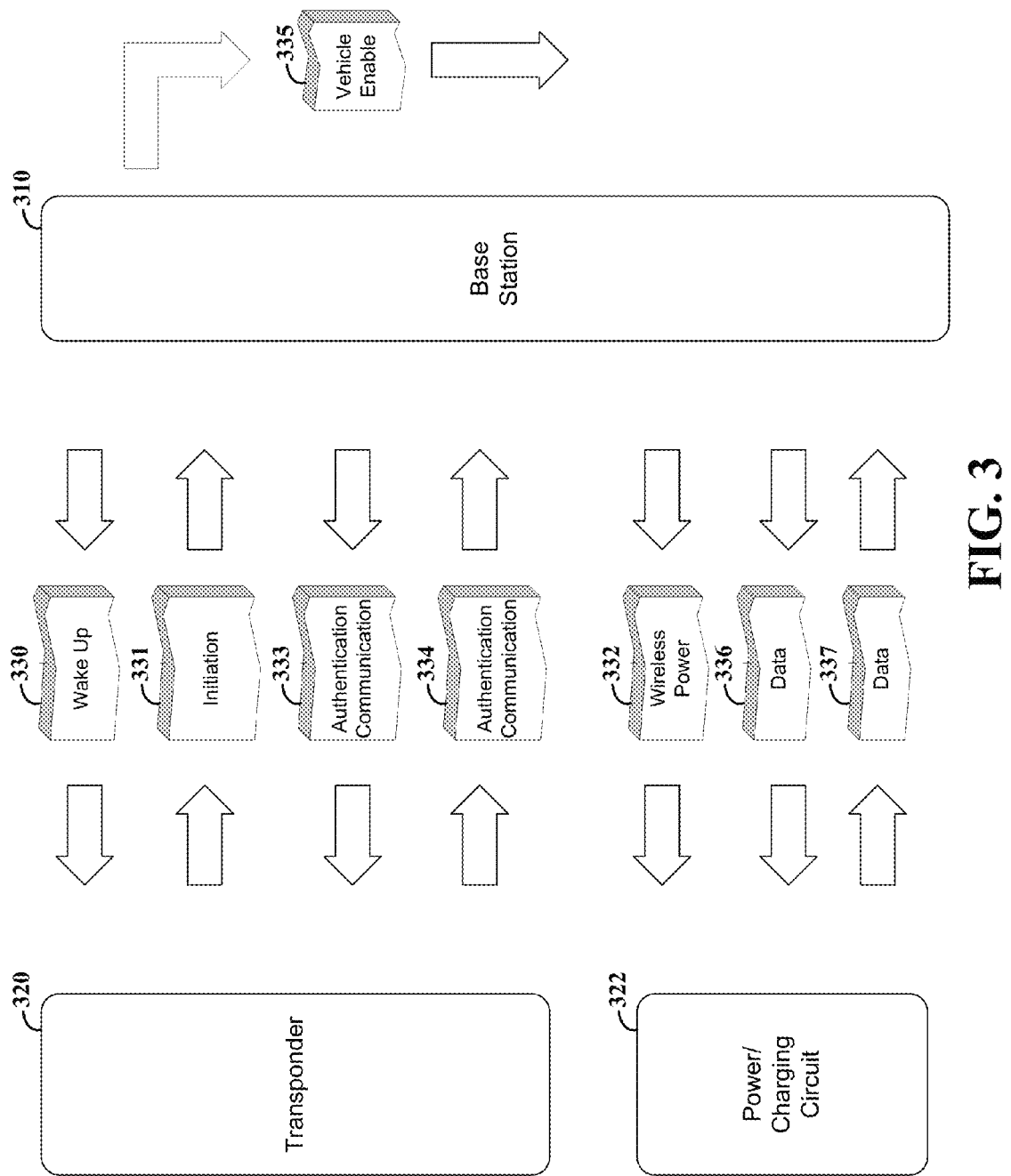
FIG. 3 shows a system and related data flow for transponder authentication and power transmission, in accordance with another example embodiment of the present invention.

FIG. 3 shows a system 300 and related data flow for transponder authentication and power transmission, in accordance with another example embodiment of the present invention. The system includes a base station 310, transponder 320 and power/charging circuit 322. For communicating with the transponder 320, the base station 310 drives an antenna to send a wake-up signal 330 to the transponder 320. The transponder 320 responds with an initiation signal 331. In some implementations, the base station 320 does not send the wake-up (e.g., polling) signal, and instead monitors for an initiation signal 331 initiated from the transponder.

Once the initiation signal 331 has been detected at the base station, the base station terminates ongoing power transmission at 332 (if active), and enters into an authentication mode for authenticating the transponder and providing vehicle access. During the authentication mode, authentication communications 333 and 334 are respectively sent to and received from transponder 320. These communications may, for example, also be part of wake-up communications 330 and/or initiation communications 331. For authenticated transponders, the base station 310 generates and outputs a vehicle enable signal 335, as discussed herein.

In some embodiments, data is also communicated between the base station 310 and the power/charging circuit 322, as shown with data 336 and 337. Such data may, for example, involve communications between a mobile telephone that is being charged, and the base station. Such communications may be effected for a variety of applications.

The various components, circuits and methods described herein can be implemented using a variety of devices and methods. For example, modules, logic or processing circuits can be implemented using one or more of: discrete logic circuitry, fully-programmable and semi-programmable circuits such as PLAs (programmable logic arrays), specialized processors or general purpose processors that are specially programmed. Combinations of these and other circuit components are also possible and within the scope of various embodiments, including those discussed above. For example, a computing component in a base station as shown in FIG. 1 can be implemented in a variety of circuit-based forms, such as through the use of data processing circuit modules. Such systems are exemplified by implementation in high-speed programmable computer/processor circuits, or in combination with discrete and or semi-programmable circuitry (e.g., as Field-Programmable Gate Arrays, Programmable Logic Devices/Arrays).

Based upon the above discussion and illustrations, those skilled in the art will readily recognize that various modifications and changes may be made to the present invention without strictly following the exemplary embodiments and applications illustrated and described herein. For example, additional antennas can be used, different communication types and different power-based transmission approaches can be implemented. Such modifications do not depart from the true spirit and scope of the present invention, including that set forth in the following claims.

What is claimed is:

1. For use in wirelessly charging portable devices and in both powering and authenticating remote operator-carried transponders for activating an automotive circuit, an apparatus comprising:
    a portable device including circuitry configured to be wirelessly charged;
    a first circuit-based module including signal transmission circuitry and configured an arranged to
        operate in a first mode to generate and transmit a first signal to wirelessly charge a portable device, wherein the first circuit-based module is configured to communicate and exchange data with the portable device while in the first mode and while wirelessly charging the portable device by energy sourced from the first signal, and in response to detecting the presence of a remote transponder, operate in a second mode to generate and transmit a second signal to power and communicate authentication data with the remote transponder; and a second circuit-based module including logic circuitry and configured and arranged to authenticate the transponder by accessing and processing stored authentication data with authentication data carried in signals received from the remote transponder via the first module, and generate an output for activating the automotive circuit based upon the authentication.

2. The apparatus of claim 1, wherein the first module is configured and arranged to generate and transmit the first signal by generating and transmitting a signal at a high power level that exceeds an operating power level of the transponder, and to generate and transmit the second signal at a reduced power level at which the transponder operates, the first and second signals being radio frequency signals having a common carrier frequency.

3. The apparatus of claim 1, wherein the first module is configured and arranged to respectively transmit the first and second signals exclusively of one another.

4. The apparatus of claim 1, wherein the first module is configured and arranged to generate and transmit the second signal by generating and transmitting a data-carrying radio frequency signal in response to data in a signal received from the remote transponder, the second signal including authentication data, and to provide authentication data, received from the transponder in response to the second signal, to the second module.

5. The apparatus of claim 1, wherein the first and second modules include at least one of a circuit and instructions stored on a non-transitory computer-readable medium that, when executed by a computer processor, cause the processor to carry out the respective actions.

6. The apparatus of claim 5, wherein the first and second modules include circuits on a common integrated circuit.

7. The apparatus of claim 1, wherein the second module is configured and arranged to communicate instructions over a vehicle communication bus that, when processed by a remote circuit, cause the remote circuit to activate a transponder-based circuit for at least one unlocking a door and activating a vehicle drive system.

8. The apparatus of claim 1, further including an antenna connected to the first module, the first module being configured and arranged to transmit the respective first and second signals via the antenna.

9. The apparatus of claim 1, further including at least two antennas connected to the first module, the first module being configured and arranged to drive at least one of the antennas with the first signal to wirelessly charge the portable device, and to drive at least another one of the antennas to transmit the second signal to communicate with the remote transponder.

10. The apparatus of claim 1, further including an array of antennas connected to the first module, the first module being configured and arranged to generate and transmit the first signal by driving the array of antennas with the first signal at a carrier frequency and at high power, to wirelessly power the portable device via at least one of the antennas in the array of antennas, and generate and transmit the second signal by driving at least one of the antennas in the array of antennas with the second signal at the carrier frequency, at a power that is significantly lower than the power at which the array of antennas is driven with the first signal.

11. The apparatus of claim 1, wherein the first module is configured and arranged to operate in the second mode by, in response to detecting the presence of the remote transponder, terminate the transmission of the first signal for wirelessly charging the portable device and, after terminating the transmission of the first signal, transmit the second signal at a power that is significantly reduced, relative to the power at which the first signal is transmitted.

12. The apparatus of claim 11, wherein the first module is configured and arranged to, after terminating the transmission of the first signal and transmitting the second signal to communicate authentication data to authenticate the remote transponder, generate and transmit a third signal to resume wireless charging of the portable device.

13. A vehicle base station apparatus for wirelessly charging portable devices and communicating with remote operator-carried transponders, the apparatus comprising:

a portable device including circuitry configured to be wirelessly charged;

a transceiver including signal transmission circuitry and configured and arranged to operate in a first mode to generate and transmit a high-power signal to transmit wireless power to a portable device, wherein the transceiver is configured to communicate and exchange data with the portable device while in the first mode and while wirelessly charging the portable device by energy sourced from the high power signal, and operate in a second mode to generate and transmit a low-power data-carrying signal to communicate authentication data with a remote operator-carried transponder, and to receive authentication data from the remote operator-carried transponder;

an interface module including communication circuitry and configured and arranged to communicate data over a vehicle bus; and an authentication module including logic circuitry and configured and arranged to authenticate the remote operator-carried transponder by processing the authentication data received from the remote operator-carried transponder with stored authentication data, and in response to authenticating the remote operator-carried transponder, communicate activation data over the vehicle bus, via the interface module, the activation data being configured and arranged to control the operation of at least one vehicle circuit.

14. The apparatus of claim 13, wherein the transceiver is configured and arranged to operate in the second mode to generate and transmit the low-power data-carrying signal by limiting the power of the low-power data-carrying signal to an operating power of the operator-carried transponder.

15. The apparatus of claim 13, wherein the transceiver is configured and arranged to operate in the second mode to generate and transmit the low-power data-carrying signal to power the operator-carried transponder, the high-power signal and the data-carrying signal being radio frequency signals having respective frequencies that are within about 50 kHz.

16. The apparatus of claim 13, further including at least two antennas connected to the transceiver circuit, the transceiver circuit being configured and arranged to transmit and receive the signals with the transponder via at least one of the antennas, and to transmit the signal to wirelessly power a remote power-reception circuit via at least another one of the antennas.

17. A method for wirelessly charging portable devices and in both powering and authenticating remote operator-carried transponders for activating an automotive circuit, the method comprising:

generating and transmitting a first radio frequency signal, via a transmitter circuit and at least one antenna, to wirelessly charge a portable device, and exchanging data with the portable device being wirelessly charged by energy sourced from the first radio frequency signal;

in response to detecting the presence of a remote transponder, via the at least one antenna, generating and transmitting a second signal to power and communicate authentication data with the remote transponder via the transmitter circuit and the at least one antenna; and authenticating the transponder by accessing and processing stored authentication data with authentication data carried in signals received from the remote transponder, and generate an output for activating the automotive circuit based upon the authentication.

18. The method of claim 17, wherein generating and transmitting the first signal includes generating and transmitting a signal at a high power level that exceeds an operating power level of the transponder, and generating and transmitting the second signal includes generating and transmitting the second signal at a reduced power level at which the transponder operates.

19. The method of claim 17, wherein generating and transmitting the first and second signals includes transmitting the first and second signals exclusively of one another.

20. The method of claim 17,
wherein generating and transmitting the first signal includes generating the first signal at a high power level that exceeds an operating power level of the transponder, and transmitting the first signal via a plurality of antennas to wirelessly charge the portable device, wherein generating and transmitting the second signal includes generating and transmitting the data-carrying radio frequency signal in response to data in a signal received from the remote transponder, the second signal including authentication data, and further including a step of communicating data over a vehicle communication bus in response to receiving a response from the remote transponder to the authentication data, the communicated data being operable for at least one of unlocking a door and activating a vehicle drive system in the vehicle.

* * * * *